(12) United States Patent
Riley

(10) Patent No.: US 7,088,264 B2
(45) Date of Patent: Aug. 8, 2006

(54) FLIGHT SAFETY SYSTEM MONITORING COMBINATIONS OF STATE VALUES

(75) Inventor: Victor Andrew Riley, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 439 days.

(21) Appl. No.: 10/098,275

(22) Filed: Mar. 14, 2002

(65) Prior Publication Data

US 2003/0206119 A1 Nov. 6, 2003

(51) Int. Cl.
*G08B 23/00* (2006.01)

(52) U.S. Cl. .................. 340/963; 340/945; 340/964; 340/966; 340/969; 340/970; 701/3; 701/29; 701/33

(58) Field of Classification Search ............... 340/438, 340/449, 450, 963, 943, 966, 970, 969, 964, 340/945, 439; 701/3, 4, 29, 33, 98, 120
See application file for complete search history.

(56) References Cited

U.S. PATENT DOCUMENTS

| | | | | |
|---|---|---|---|---|
| 3,581,014 A | | 5/1971 | Vogel et al. ............ | 179/100.1 |
| 4,442,491 A | | 4/1984 | Olhausen, Jr. ............ | 364/454 |
| 4,849,756 A | * | 7/1989 | Bateman ................ | 340/970 |
| 5,075,881 A | | 12/1991 | Blomberg et al. ......... | 364/578 |
| 5,119,091 A | * | 6/1992 | Zweifel ................. | 340/968 |
| 5,225,829 A | * | 7/1993 | Bateman ................ | 340/967 |
| 5,710,559 A | | 1/1998 | Krogmann | |
| 5,936,552 A | * | 8/1999 | Wichgers et al. .......... | 340/963 |
| 6,043,757 A | * | 3/2000 | Patrick ................. | 340/963 |
| 6,043,759 A | * | 3/2000 | Paterson et al. .......... | 340/970 |
| 6,150,959 A | * | 11/2000 | Germanetti ............. | 340/971 |

FOREIGN PATENT DOCUMENTS

| | | |
|---|---|---|
| DE | 10046007 C | 10/2001 |
| EP | 0971321 A | 1/2000 |
| WO | WO9602853 A | 2/1996 |

* cited by examiner

*Primary Examiner*—Hung Nguyen
(74) *Attorney, Agent, or Firm*—Andrew A. Abeyta

(57) ABSTRACT

A method and system compares combinations of vehicle or aircraft state variables against known combinations of potentially dangerous states. Alarms and error messages are selectively generated based on such comparisons. In one embodiment, pairs of aircraft state variables are selected and compared to known undesirable pairs of state combinations that indicate an error or a condition that a crew should monitor closely. The combinations and error messages are provided by the database. The comparisons are conducted on a periodic basis monitoring real time states of the parameters collected from various sensors and commands. Experts considering a matrix that provides an exhaustive pairwise comparison of potentially important state variables initially identify undesirable state combinations. Error messages and identification of potential alarms are generated based on both knowledge of actual accidents, and on use of expert knowledge to predict potentially dangerous states.

30 Claims, 7 Drawing Sheets

| | | THRUST | | |
|---|---|---|---|---|
| | | IDLE | MEDIUM | HIGH |
| SPEEDBRAKES | IN | | | |
| | OUT | ADVISORY | CAUTION | WARNING |
| | HIGH | ADVISORY | CAUTION | WARNING |

INFORMATION REQUIREMENTS: ALERT PILOTS IF SPEEDBRAKES ARE OUT WITH HIGH THRUST SELECTED

FIG. 4

|  | EPR |  |  |
|---|---|---|---|
|  | LOW | MEDIUM | HIGH |
| ACCELERATION LOW |  | CAUTION | WARNING |
| ACCELERATION MEDIUM | ADVISORY |  |  |
| ACCELERATION HIGH | CAUTION | CAUTION | WARNING |

|  |  | ALTITUDE |  |  |
|---|---|---|---|---|
|  |  | LOW | MEDIUM | HIGH |
| V/S | HIGH + |  |  | WARNING |
| V/S | + |  |  | WARNING |
| V/S | LEVEL |  |  |  |
| V/S | − | CAUTION |  |  |
| V/S | HIGH − | WARNING |  |  |

HIGH RATE OF DESCENT AT LOW ALTITUDE MAY INDICATE AN ERROR

|  | TRACK | | |
|---|---|---|---|
|  | LEFT | CENTER | RIGHT |
| ROLL LEFT |  | CAUTION | WARNING |
| ROLL CENTER |  |  |  |
| ROLL RIGHT | WARNING | CAUTION |  |

FIG. 8

FLIGHT SAFETY SYSTEM MONITORING COMBINATIONS OF STATE VALUES

CROSS REFERENCE TO RELATED APPLICATIONS

This application is related to co-pending US application: "Aircraft Signal Definition for Flight Safety System Monitoring System", PCT/US03/07562, filed on the same date herewith and assigned to the same assignee.

FIELD OF THE INVENTION

The present invention relates to flight safety, and in particular to a flight safety system that monitors sets of state values to provide warnings of potentially unsafe situations.

BACKGROUND OF THE INVENTION

Controlled Flight Into Terrain (CFIT) accidents have received much attention recently, but most attempts to address them have concentrated on making flight crews more aware of terrain. However, a study of recent accidents suggests that many are caused by factors unrelated to flight crew awareness of terrain. Many such accidents are near airports, where conventional terrain avoidance/warning systems are ineffective due to the inherent lower altitude of the plane required for landing. In one example, a wrong descent mode is thought to have been selected. While the crew selected a parameter for a flight path angle, it was applied to a vertical speed mode of descent. The parameter was too great for such a mode, likely causing the accident. In a further example, it was not realized that a first officer's Flight Director was still selected and the autoflight system was following Flight Director guidance. In one more example, a crew failed to retract speedbrakes when attempting to climb out of a canyon.

SUMMARY OF THE INVENTION

Sets of vehicle state variables are compared against known combinations of potentially dangerous vehicle states. Alarms and error messages are selectively generated based on such comparisons. In one embodiment, pairs of aircraft state variables are selected and compared to known undesirable pairs of state combinations that indicate an error or a condition that the crew should monitor closely. The combinations and error messages are provided by the database. The comparisons are conducted on a periodic basis monitoring real time states of the parameters collected from various sensors and commands.

Experts initially identify undesirable state combinations. In one embodiment, the experts consider a matrix that provides an exhaustive pair wise comparison of potentially important state variables. Error messages and identification of potential alarms and displays of information to the crew are generated based on both knowledge of actual accidents, and on use of expert knowledge to predict potentially dangerous states.

BRIEF DESCRIPTION OF THE DRAWINGS

FIG. 4 is a diagram of a comparison of one pair of state variables (speedbrakes and thrust) for different values of the variables.

FIG. 8 is a representation of logic associated with roll and track.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Use of a system that compares combinations of values of states of a vehicle such as an aircraft to previously identified unsafe combinations is described, followed by a section describing a methodology of determining the unsafe combinations.

Figure 1:
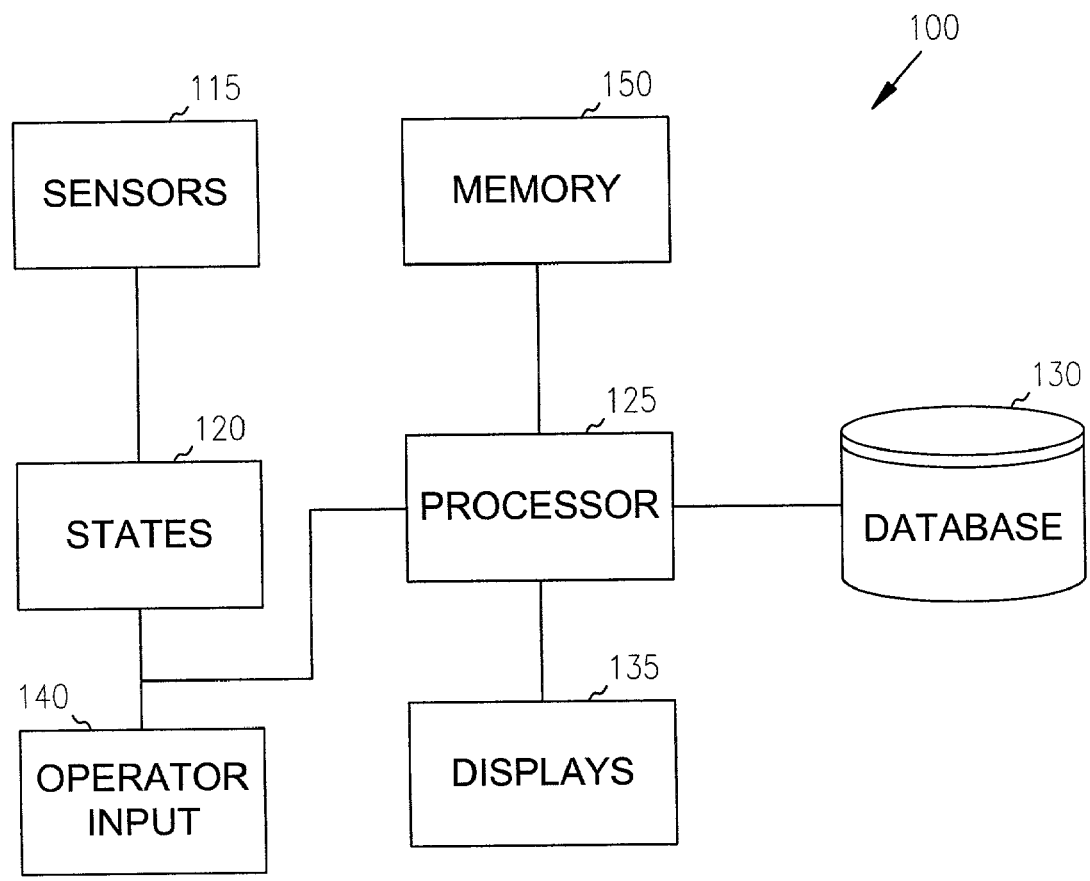
FIG. 1 is a simplified block diagram of a flight safety system utilizing sets of state values.

A system that monitors states of a vehicle such as an aircraft or other vehicle such as a spacecraft, or land-based vehicle is shown at 110 in FIG. 1. A plurality of sensors 115 sense the state of the aircraft, such as airspeed, thrust and many other states. In one embodiment, over 100 states are sensed. The sensors are coupled to a states module 120 that is integrated with a processor 125, or separate from it. The states module 120 converts physical sensor signals to a digital signal if not already in such form for use by the processor 125. Processor 125 is coupled to a database 130. Database 130 contains a record of identified unsafe combinations of state values. It receives the sensed state values, and queries the records to identify unsafe or undesired combinations of sensed state values. The records in database 130 contain error messages in one embodiment, or other information identifying a mechanism by which to notify an operator of an unsafe condition. In one embodiment, database 130 comprises a database server, either integrated with processor 125, or independent from processor 125.

Identified unsafe conditions are provided back to the processor 125. Processor 125 receives such identifications and associated error messages or other information and provides a corresponding notice to operators via a display 135. Display 135 is used to represent all visual displays, audible alarms, and any other type of mechanism usable for calling operator attention to potentially unsafe conditions.

In one embodiment, states of the aircraft include commands that are pending or being implemented by computers or other devices on the aircraft. Such commands for example include autopilot, autothrottle, flight phase, programmed trajectory and others. Command values, such as on or off, are provided via a user input mechanism 140. Mechanism 140 is used to represent physical switches, keyboards, buttons and any other type of device usable on aircraft for entering commands, including voice recognition.

A memory 150 or other computer readable medium is coupled to processor 125 to provide storage of data and computer executable code for execution on processor 125. In one embodiment, processor 125, memory 150 and database 130 comprise a standard or modified personal computer, or other type of computer or electronic device capable of carrying out functions associated with the current invention.

Figure 2:
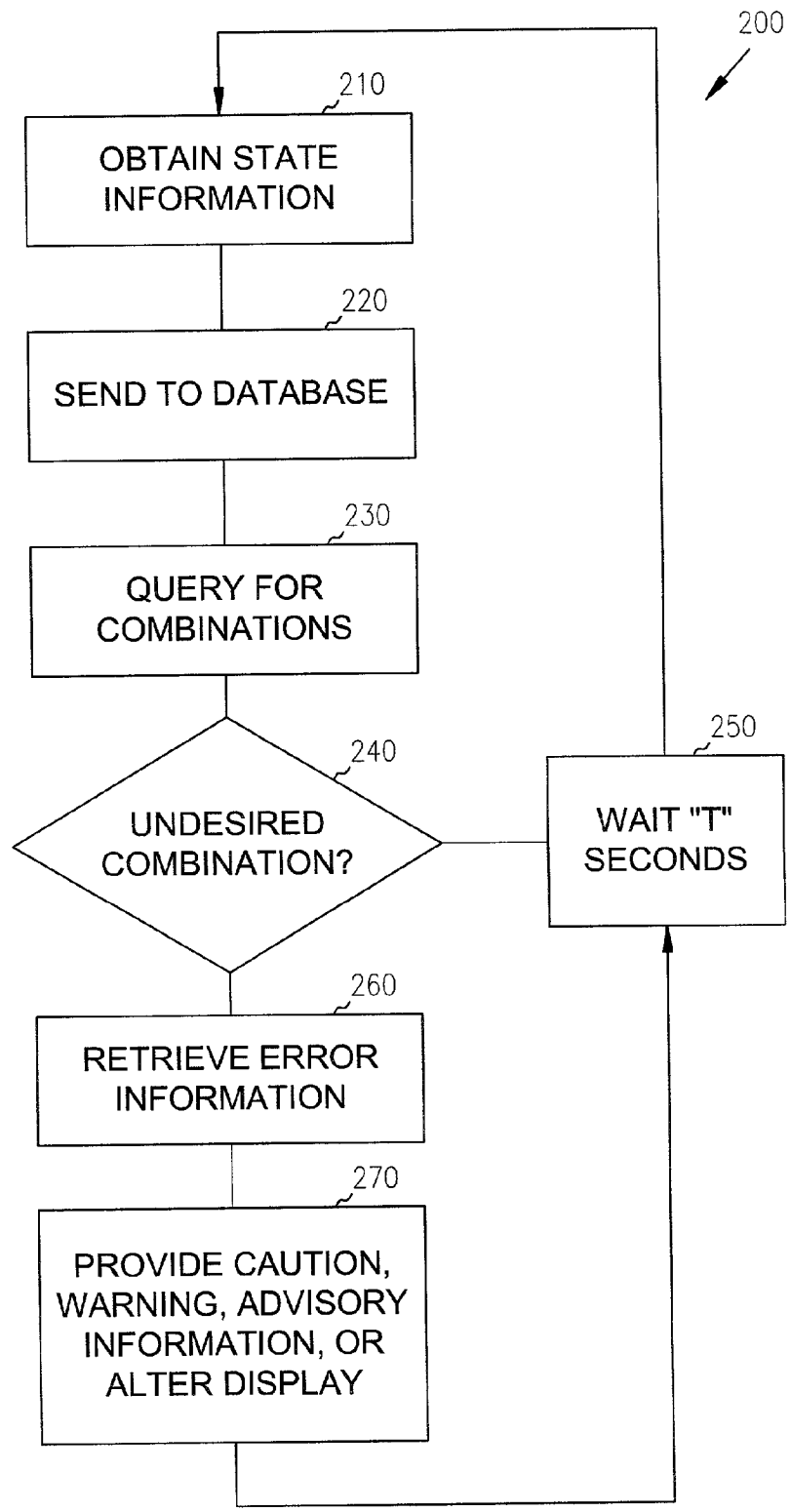
FIG. 2 is a flow chart showing operation of the system of FIG. 1 in comparing combinations of state values to determine unsafe conditions for an aircraft.

A flowchart representative of functions carried out by one embodiment of the current invention is shown at 200 in FIG. 2. At 210, state information such as state values obtained from the various sensors and commands that are currently in effect in the aircraft is obtained. This information is collected and sent to the database at 220. The database then performs queries to find matches with previously identified potentially unsafe combinations. In one embodiment, the current state information is stored in a desired database format, and the known unsafe combinations are used as a query against the current state information. In further embodiments, current state values are used to query the known unsafe combination dataset.

In some cases, a combination of two state values may be indicative of a potentially unsafe condition of the aircraft. Whether or not such condition is really potentially unsafe may depend on the value of one or more further states. Thus, many combinations are simply pairs of values for the states, while others actually consist of comparing values of more than two states. Prior to provision of a warning, query block 230 performs the additional comparison. The comparison is also done at 260 in further embodiments, and the information related to additional states is used to tailor the error information.

If no undesirable combination of state values is found at 240, the process waits for a fixed time, T, at 250 prior to starting at 210 again by obtaining then current state information. T may range from seconds or minutes to less than a second for different state variables. Many values do not change rapidly, and T may be a function of how rapidly the values may change and how potentially critical they are to flight safety.

If one or more undesirable combinations of state values are found, error information, such as warnings, or commands for warning mechanisms are retrieved at 260, and at 270, such error information is used to provide cautions, warnings or advisories at 270. Display formats may also be altered, such as by turning on an indicator for one of the states, for instance, a speed brake indicator.

Figure 3:
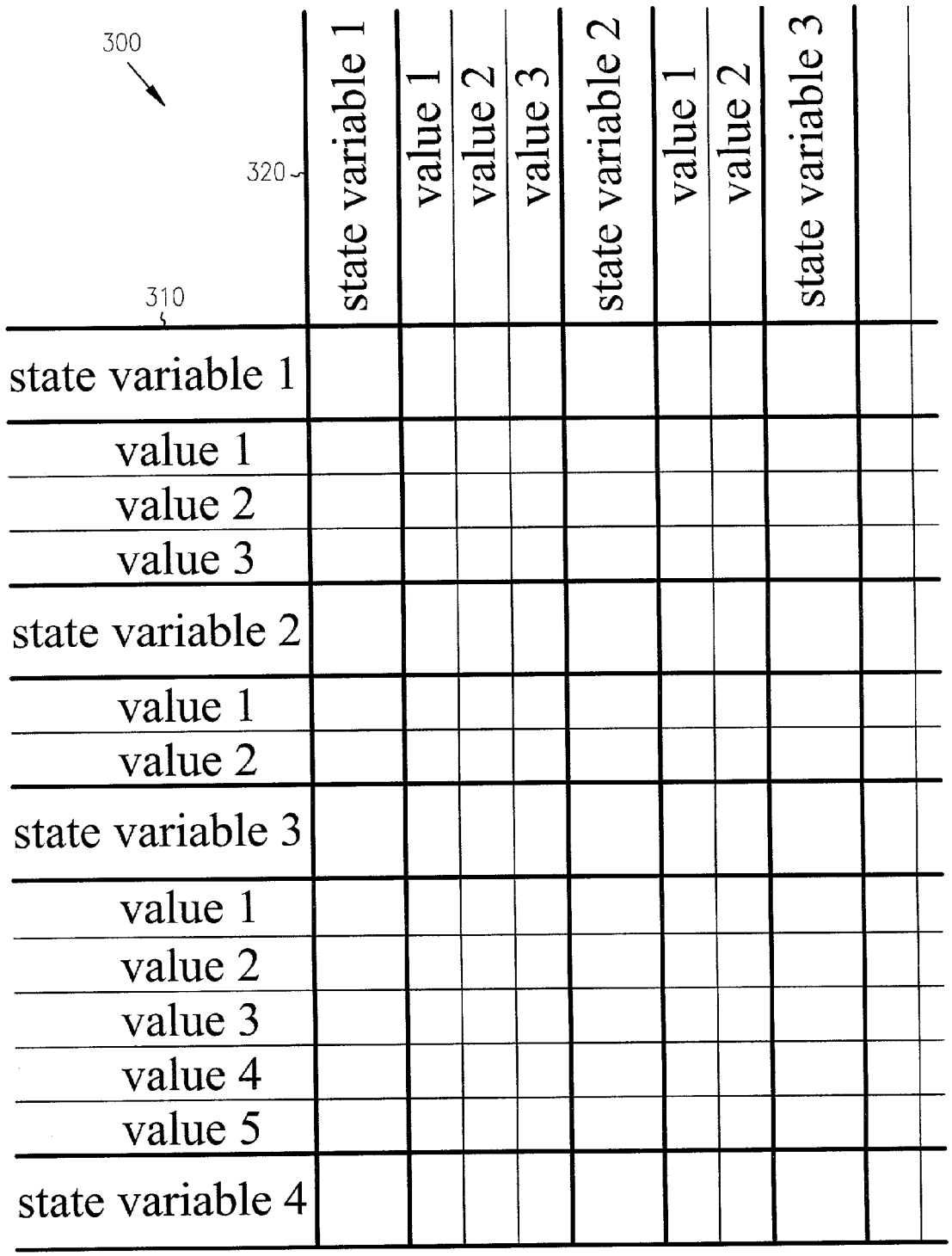
FIG. 3 is a diagram of an analysis structure for analyzing combinations of state variables.

Predetermined undesirable combinations are determined in one embodiment by starting with a matrix shown at 300 in FIG. 3. The matrix consists of a set of rows 310 of state variables with corresponding potential values, and a set of columns 320 of state variables with corresponding values. In one embodiment, the columns and rows are identical, starting with state variable 1 having potential values 1, 2 and 3, state variable 2 having potential values 1 and 2, and further state variables and values. Where the state variables correspond to sensed conditions, the values may be quantized, or otherwise characterized, such as by indicating a high, medium, low or very low airspeed. In this embodiment, all potential pairs of values for the state variables are identified in the matrix. One or more experts are then used to determine whether or not such pairs present a potentially dangerous or otherwise undesirable combination. The experts rely on their own experience, knowledge and education, as well as analysis of previous accidents. By thinking about every possible combination and possible causes and effects, many undesirable combinations are methodically identified.

When such undesirable combinations are identified, the experts, or others determine what type of warning or indication to provide to operators of aircraft that encounter such combinations. One type of indication is information advising the operator about the conflict. Another indication informs the operator to ignore a reading. Such an indication will save operators from cutting engine speed on takeoff due to faulty thrust readings. Thus, when low acceleration in combination with medium or high thrust readings are detected, the operator may be warned to abort take-off because critical sensor data are faulty. (Note here that the system cannot determine which data are faulty, but rather that a particular combination of data readings would not be possible if all the sensors were working accurately. It is this use of state combinations that makes this concept uniquely able to detect failure conditions that traditional fault logic, based on single sensors or single states, cannot.)

Upon identification of such unsafe combinations, the database of unsafe combinations is generated. If such unsafe combinations depend on other state values, or if the type of information communicated to an operator is dependent on other state values, this is incorporated into the database in the form of further embedded queries or other mechanisms to trigger such further comparisons.

Examples of undesirable combinations of state variable values are shown in FIGS. 4–8. In FIG. 4, a combination of a high level of thrust and deployed speedbrakes is not one that a pilot would intentionally choose. Such a combination has been responsible for several tail strike landings when pilots deploy the speedbrakes to acquire the glideslope, then forget that they are out and attempt to maintain the glideslope with high levels of thrust and pitch. As seen in FIG. 4, the speedbrake variable has three potential values, in, out and high. Thrust also has three values, idle, medium and high. If the speedbrakes are out or high, different levels of alarm are provided, from advisory information, caution information and an actual warning when thrust is high.

Figure 5:
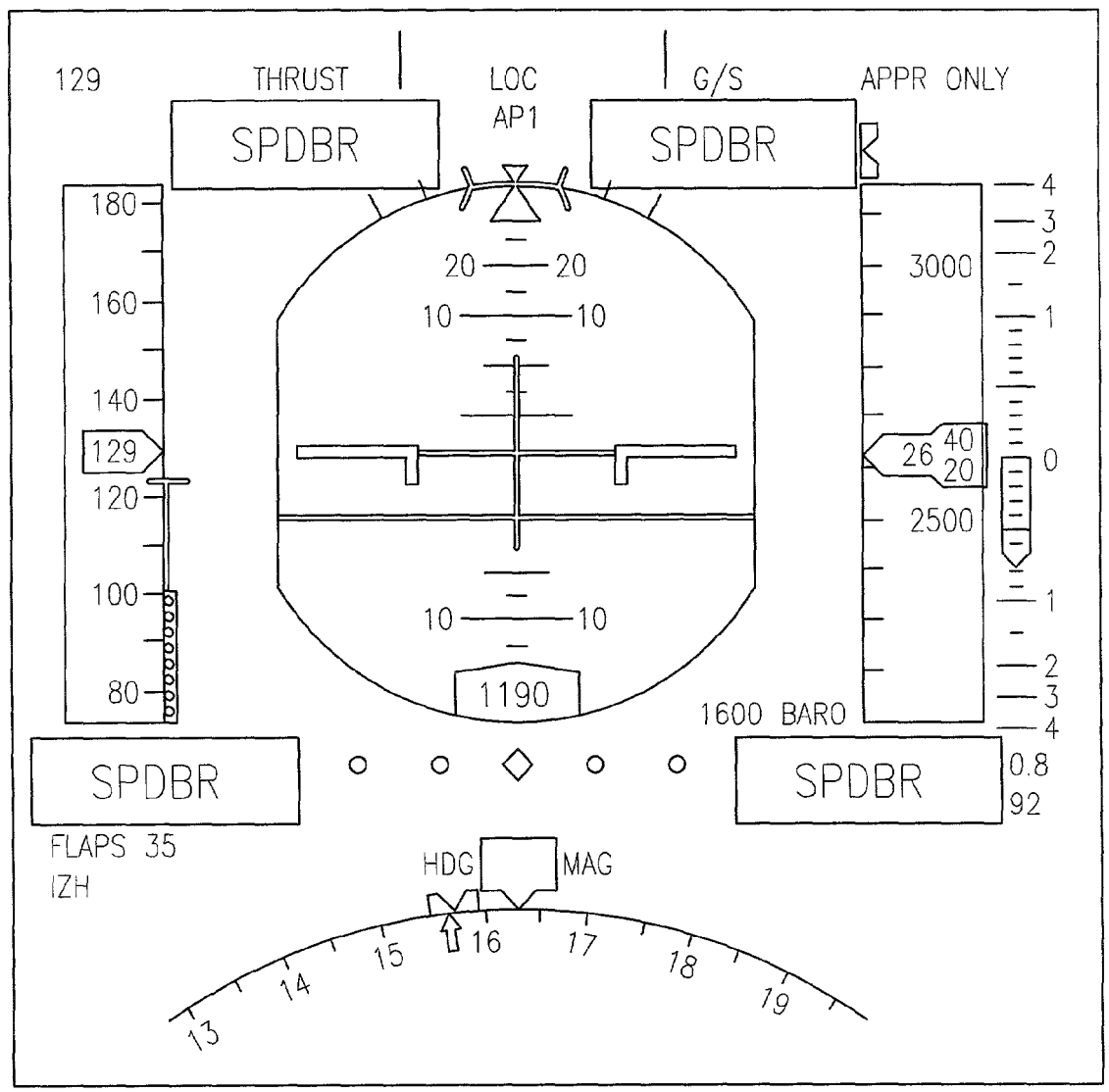
FIG. 5 is a screen shot of a cockpit simulation showing multiple speedbrake deployed indicators.

FIG. 5 is a screen shot of a cockpit simulation showing multiple speedbrake deployed indicators "SPDBR". In traditional primary flight display design, a white "SPDBR" indicator is illuminated any time the speedbrakes are deployed. The system makes no distinction between proper use of speedbrakes at a relatively high altitude with idle thrust vs. improper use at a low altitude or with high thrust. In one embodiment, a combination of deployed speedbrakes with either high thrust or low altitude would trigger the much more salient, red "SPDBR" alarm shown in FIG. 5. This demonstrates how detection of an undesirable state combination would ultimately result in a reconfigured display to the crew. In further embodiments, this indication is accompanied by an audible alarm, activation of the central caution and warning system, or other system responses.

Figures 6, 7:
FIG. 6 is a representation of logic associated with acceleration and engine thrust.
FIG. 7 is a representation of logic associated with high rate of descent and altitude.

FIG. 6 shows acceleration versus engine thrust. This comparison results in a warning when low acceleration and high thrust are detected. In one case, an engine thrust sensor iced up, and the crew received misleadingly high thrust indication during a takeoff roll. This prompted them to reduce thrust below the level required to accelerate adequately for takeoff. The combination of high sensed thrust and low sensed acceleration is anomalous, indicating there is a problem, even if the source of the problem is not known. High acceleration and low thrust can also be a concern, and result in a caution indicating unreliable sensor readings.

In FIG. 7, rate of descent is combined with altitude. High rates of descent selected near the ground can cause a lethal combination and result in a warning, either as an error, or a dangerous situation. This combination has occurred when the crew believed it was in one descent mode, and the aircraft was actually in another, or changed to another mode without the crew realizing the change occurred. The setting by the crew resulted in a much faster descent rate than desired.

In FIG. 8, roll is combined with track. Roll has values of left, center and right, while track also has values of left, center and right. If these variables have opposite values, a warning is sounded. Such opposite values result from unforeseen symmetry problems. The experts arrived at this potentially dangerous combination from an actual event where a fuel leak resulted in a weight imbalance that was compensated for by the autopilot, causing a continuous corrective roll input that was unannounced to the crew. This was a silent failure that requires crew vigilance to detect. The crew was not aware of the imbalance, and when the aircraft was taken off autopilot, it went into a dive.

Full analysis tables are shown and described in the following paragraphs. The tables are organized by priority of interest for one embodiment. State variable values have been described in qualitative terms. In further embodiments, for those functions selected for implementation, the qualitative levels are translated into actual quantities.

1 Speedbrakes Out for Landing

|  |  | Flaps | |  |
| --- | --- | --- | --- | --- |
|  |  | In | Out | landing |
| speedbrakes | in |  |  |  |
|  | out |  |  | warning |
|  | full |  |  | warning |

If the speedbrakes are out when the flaps are in landing configuration, it's likely that the pilot has forgotten to retract them after acquiring the glideslope. A warning should be given to remind the pilot to retract them, to avoid a tail strike landing. Information requirement: speedbrakes extended warning on Primary Flight Display (PFD) or Head Up Display (HUD).

1 Speedbrakes Out for Landing

|  |  | Speedbrakes | |  |
| --- | --- | --- | --- | --- |
|  |  | In | Out | full |
| gear | Up |  |  |  |
|  | Down |  |  |  |
|  | Locked |  | caution | caution |

If the gear are down and locked and the speedbrakes are still out, the crew may have forgotten to retract them after acquiring the glideslope. The speedbrakes indicator on the PFD should have a unique appearance as a reminder that the speedbrakes are out during approach. Information requirement: salient speedbrakes reminder on PFD, HUD.

1 Speedbrakes Out for Landing

|  |  | speedbrakes | |  |
| --- | --- | --- | --- | --- |
|  |  | in | out | full |
| glideslope | captured |  | warning | warning |
|  | not captured |  |  |  |

If the speedbrakes are still deployed when the glideslope signal is captured and airspeed is close to the target speed, the crew may have forgotten to retract them. A warning should be given. Information requirement: warning on PFD, HUD.

1 Speedbrakes Out for Landing

|  |  | speedbrakes | |  |
| --- | --- | --- | --- | --- |
|  |  | in | out | full |
| flap speeds | 0 |  |  |  |
|  | position 1 |  |  |  |
|  | position 2 |  |  |  |
|  | position 3 |  |  | caution? |
|  | Full |  | warning | warning |

Landing flaps indicates that the pilot has acquired the glideslope and should be attempting to maintain a three degree flight path angle. Speedbrake deployment would work against this, so a warning should be given if the speedbrakes are still out. Similarly, flaps in the second-to-last position would indicate that the aircraft is near the ground, so full speedbrake extension might be unwise. In this case, a caution might be given to remind the crew that the speedbrakes are still deployed. Information requirement: warning on PFD, HUD.

1 Speedbrakes Out Near Terrain

|  |  | speedbrakes | |  |
| --- | --- | --- | --- | --- |
|  |  | in | out | full |
| radio altitude | very low |  | warning | warning |
|  | Low |  |  | caution |

If speedbrakes are extended at a low radio altitude, it may indicate that the crew are unaware of their proximity to terrain. If the altitude is low, a caution should be given; if very low, a warning should be give. Information requirement: warning, caution on PFD, HUD, and Navigation (NAV) display.

1 Speedbrakes/Pitch Conflict

|       |        | speedbrakes |         |         |
|-------|--------|-------------|---------|---------|
|       |        | in          | out     | full    |
| pitch | high + |             | caution | caution |
|       | +      |             |         |         |
|       | Level  |             |         |         |
|       | −      |             |         |         |
|       | high − |             |         |         |

If the pilot or autopilot is commanding a very high pitch, then the pilot or autopilot may intend the airplane to climb. Since extended speedbrakes would inhibit this maneuver, the crew should be reminded that the speedbrakes are out. Information requirement: caution on PFD and HUD.

1 Speedbrakes/Thrust Conflict

|          |        | speedbrakes |         |         |
|----------|--------|-------------|---------|---------|
|          |        | in          | out     | full    |
| throttle | Idle   |             |         |         |
|          | Low    |             |         |         |
|          | Medium |             |         | caution |
|          | High   |             | caution | warning |
|          | full   |             | warning | warning |

If throttle position is high, the pilot may be attempting to maintain a slower rate of descent, maintain level flight, or climb, all of which would be defeated by extended speedbrakes. This may happen on landing if the pilots forget to retract the speedbrakes after acquiring the glideslope, or it may happen if the pilots attempt an evasive maneuver for traffic or terrain. Information requirement: caution and warning on HUD, PFD, NAV.

1 Speedbrakes/Thrust Conflict

|        |        | speedbrakes |         |         |
|--------|--------|-------------|---------|---------|
|        |        | in          | out     | full    |
| EPR/N1 | Low    |             |         |         |
|        | Medium |             | caution | warning |
|        | High   |             | warning | warning |

If the engines are producing a high level of thrust, the pilot or autopilot may be attempting a maneuver that is being defeated by the extended speedbrakes, such as attempting to climb away from terrain. Information requirement: caution and warning on HUD, PFD, NAV.

1 Speedbrakes Out During GPWS Alert

|      |     | speedbrakes |         |         |
|------|-----|-------------|---------|---------|
|      |     | in          | out     | full    |
| GPWS | On  |             | warning | warning |
|      | Off |             |         |         |

If a Ground Proximity Warning System (GPWS) alert is encountered and the speedbrakes are extended, the crew may need a reminder to retract them.

1 Speedbrakes Out During Windshear Alert

|           |     | speedbrakes |         |         |
|-----------|-----|-------------|---------|---------|
|           |     | in          | out     | full    |
| windshear | On  |             | warning | warning |
|           | Off |             |         |         |

If a windshear alert is encountered and the speedbrakes are extended, the crew may need a reminder to retract them.

1 Approaching Altitude Limits

|     |        | Baro altitude |         |            |         |           |
|-----|--------|---------------|---------|------------|---------|-----------|
|     |        | very low      | low     | transition | high    | very high |
| V/S | high + |               |         |            |         | caution   |
|     | +      |               |         |            |         |           |
|     | level  |               |         |            |         |           |
|     | −      |               |         |            |         |           |
|     | high − | warning       | caution |            |         |           |

A high rate of climb at a very high altitude may take the aircraft beyond its ceiling; however, initiation of such an extreme maneuver by the crew would be likely only if really needed, so a caution should be used instead of a more intrusive warning. A descent near the ground should be alerted to the crew; a high rate of descent near the ground should result in a warning.

1 Airspeed Error Detection

|          |        | airspeed |     |        |                     |                     |
|----------|--------|----------|-----|--------|---------------------|---------------------|
|          |        | very low | low | medium | high                | very high           |
| throttle | idle   |          |     |        | error if climbing   | error if climbing   |
|          | low    |          |     |        | error if climbing   | error if climbing   |
|          | medium |          |     |        |                     |                     |
|          | high   |          |     |        |                     |                     |
|          | full   |          |     |        |                     |                     |

If the throttle is at idle or low and the aircraft is climbing and the airspeed reads high, there may be a bad sensor (such as a blocked pitot tube). Information requirements: cautions, warnings on PFD, HUD, NAV display, and Multi Function Display (MFD).

2 Autopilot Correction of Aircraft Imbalance

|  |  | autopilot | |
|---|---|---|---|
|  |  | on | off |
| roll | hard left | A/P malfunction? | |
|  | Left | imbalance if persistent | |
|  | Level | | |
|  | Right | imbalance if | |

-continued

|  |  | autopilot | |
|---|---|---|---|
|  |  | on | off |
|  | hard right | persistent A/P malfunction? | |

If the autopilot commands a persistent roll in one direction or the other while the aircraft flies a straight heading and no winds can account for the roll command, the aircraft may be experiencing an imbalance in either weight or thrust. This may be due to a cargo shift, a fuel imbalance, a fuel leak, or an unannunciated engine fault. Information requirement: caution, aileron positions

2 Speedbrakes Deployed During Climb

|  |  | speedbrakes | | |
|---|---|---|---|---|
|  |  | in | out | full |
| V/S | high + | | warning caution | warning caution |
|  | + | | | |
|  | Level | | | |
|  | − | | | |
|  | high − | | | |

If the pilots attempt to extend the speedbrakes while the aircraft is climbing rapidly, the negative G force may overstress the airframe. Information requirements: caution, warning on PFD, HUD, NAV.

2 Icing

|  | anti ice | |
|---|---|---|
|  | on | off |
| weather | | caution |

If possible icing conditions are encountered, based either on sensor readings or on uplinked weather data, and the anti icing system is off, the crew should be alerted to turn it on. Information requirement: caution on PFD, HUD, NAV display.

2 Low Takeoff Acceleration

|  |  | Flight phase | | | | | | | |
|---|---|---|---|---|---|---|---|---|---|
|  |  | taxi | takeoff | climb | cruise | descent | approach | go around | landing | roll out |
| acceleration | very low | | warning | | | | | | | |
|  | low transition | | warning | | | | | | | |

Low acceleration at takeoff may indicate a sensor fault or crew error.

2 GPWS with Engine Problem

|  | engine fire | |
|---|---|---|
|  |  | |
| GPWS | off | |
|  | on | account |

If an engine encounters a problem that would reduce its performance, GPWS should assume reduced performance in its warning algorithms.

2 TCAS with Engine Problem

|  | engine fire | |
|---|---|---|
|  |  | |
| TCAS | off | |
|  | on | account |

If an engine encounters a problem that would reduce its performance, the Traffic Collision Avoidance System (TCAS) should account for reduced performance in its collision avoidance solutions.

2 Windshear with Engine Problem

|  |  | engine fire |
|---|---|---|
| Windshear | off | |
| | on | account |

If an engine is on fire, the windshear warning system should assume reduced performance in its warning algorithms.

2 GPWS with Engine Out

|  |  | engine failure |
|---|---|---|
| GPWS | off | |
| | on | account |

The terrain avoidance alert algorithm should account for engine out.

2 TCAS with Engine Out

|  |  | engine failure |
|---|---|---|
| TCAS | off | |
| | on | account |

The traffic avoidance alert algorithm should account for engine out.

2 Windshear with Engine Out

|  |  | engine failure |
|---|---|---|
| Windshear | off | |
| | on | account |

The windshear response algorithm should account for engine out.

2 Altitude Error Detection

| | | Baro altitude | | | |
|---|---|---|---|---|---|
| | | very low | low | transition | high | very high |
| Radio altitude | very low | | error | error | error | error |
| | low | error | | error | error | error |

A mismatch between barometric altitude and radio altitude, based on the expected barometric altitude using the terrain data base, may indicate a barometric altitude error. 2

Position Error Detection

| | radio altitude | |
|---|---|---|
| | very low | Low |
| Terrain | caution | Caution |

If the radio altitude reading disagrees with the expected altitude based on the terrain data base, there may be a position error.

2 Idle Throttle Near the Ground

| | | radio altitude | |
|---|---|---|---|
| | | very low | low |
| Throttle | idle | warning | caution |
| | low | caution | |
| | medium | | |
| | high | | |
| | full | | |

Idle throttle near the ground may indicate that the crew are unaware of how near the ground they are. Information requirement: caution, warning on PFD, HUD, NAV display.

2 Idle Thrust Near the Ground

| | | radio altitude | |
|---|---|---|---|
| | | very low | low |
| EPR/N1 | Low | Caution | |
| | medium | | |
| | High | | |

Same as above for throttle.

2 Thrust/Acceleration Mismatch

| | | acceleration | | |
|---|---|---|---|---|
| | | low | medium | high |
| throttle | Idle | | | |
| | Low | | | |
| | Medium | | | |
| | High | | caution | caution |
| | Full | | caution | caution |

If a high level of thrust is being commanded and acceleration is low, there must be a performance or sensor problem. Information requirement: caution on PFD, MFD.

2 Thrust/Acceleration Mismatch

|  |  | acceleration | | |
|---|---|---|---|---|
|  |  | Low | medium | high |
| EPR/N1/fuel flow | Low | | | |
|  | Medium | Caution | | |
|  | High | Caution | | |

If thrust measures are high and sensed acceleration is low, either the accelerometer is faulty or the thrust measures are faulty, or engine performance is being compromised. Information requirement: caution on PFD, HUD, MFD.

2 TCAS Conflicts

|  |  | weather | terrain | restricted areas | fuel range | flight plan trajectory | pro-grammed trajectory |
|---|---|---|---|---|---|---|---|
| TCAS | off | | | GPWS | | SUA | |
|  | on | check | | GPWS | | TCAS | |

If TCAS detects a traffic conflict, it should check weather and terrain constraints in developing a maneuver solution. Conflicts between traffic and terrain should be decided in favor of terrain, while those between traffic and restricted airspace or between traffic and weather should be decided in favor of traffic.

2 Pitch Down Near Terrain

|  |  | Pitch | | | |
|---|---|---|---|---|---|
|  |  | high + | + | level | − | high − |
| GPWS | off | | | | | |
|  | on | | | warning | warning | warning |

During a GPWS alert, the crew should be pulling the aircraft up to avoid terrain. Continuing with level or nose down pitch should results in a warning. Information requirement: warning on PFD, HUD.

2 Autopilot Correction for Imbalance

|  |  | Roll | | | |
|---|---|---|---|---|---|
|  |  | hard left | left | center | right | hard right |
| heading | left | | | | error if not wind | error if not wind | error if not wind |
|  | center | error if not | error if not | | error if not | error if not wind |
|  | right | wind error if not wind | wind error if not wind | error if not wind | wind | |

If the autopilot is commanding a roll to maintain a heading and there is no wind being countered, it may be correcting for another source of asymmetry, such as a fuel imbalance or an engine problem. Information requirement: caution on PFD, MFD, NAV display.

2 Unbalanced Aircraft Roll

|  |  | roll | | | |
|---|---|---|---|---|---|
|  |  | hard left | left | center | right | hard right |
| fuel imbalance | Left | warning | caution | | | |
|  | Center | | | | | |
|  | Right | | | | caution | warning |

If the aircraft is unbalanced in the direction of a hard roll command, the roll command may have an exaggerated effect and cause an upset. Information requirement: caution, warning on PFD, HUD, NAV display.

2 Unbalanced Aircraft Roll

|  |  | stick/yoke | | | |
|---|---|---|---|---|---|
|  |  | hard left | left | center | right | hard right |
| fuel imbalance | Left | warning | | | | |
|  | Center | | | | | |
|  | Right | | | | | warning |

If the aircraft is out of balance laterally, a hard roll command may cause an upset. Information requirement: warning on PFD, HUD.

2 Windshear Throttle Position

|  |  | throttle | | | | |
|---|---|---|---|---|---|---|
|  |  | idle | low | medium | high | full |
| windshear | Off | | | | | |
|  | On | | warning | warning | warning | warning |

During a windshear event, the pilot or autopilot should command full thrust. If this is not happening, the crew should be warned. Information requirement: warning on PFD, HUD.

2 V/S Error Detection

|     |        | EPR/N1  |         |         |
| --- | ------ | ------- | ------- | ------- |
|     |        | low     | medium  | high    |
| V/S | high + +  | warning |         |         |
|     | Level − |         |         |         |
|     | high − |         |         | warning |

If the aircraft is climbing with low thrust, there may be a sensor error. This should produce a warning on the PFD, HUD, and MFD. If the aircraft is descending rapidly and thrust is high, it may be in danger of overspeeding. This should result in a warning on the PFD and HUD.

2 GPWS and Throttle Position

|      |     | EPR/N1/EGT |         |      |
| ---- | --- | ---------- | ------- | ---- |
|      |     | low        | medium  | high |
| GPWS | Off |            |         |      |
|      | On  | warning    |         |      |

If thrust is low during a GPWS alert, the crew may not be responding quickly enough to the alert. Information requirement: increased alert urgency.

2 Windshear and Thrust

|           |     | EPR/N1/FF |         |      |
| --------- | --- | --------- | ------- | ---- |
|           |     | Low       | medium  | high |
| windshear | Off |           |         |      |
|           | On  | Warning   | warning |      |

If thrust is not full in response to a windshear event, the crew may not be responding to the event quickly enough, or the autoflight system may not be responding to it. Information requirement: warning on PFD, HUD, aural.

2 High Rate of Descent on Approach

|           |              | V/S    |   |       |        |
| --------- | ------------ | ------ | - | ----- | ------ |
|           |              | high + | + | level | high − |
| localizer | captured     |        |   |       | caution |
|           | not captured |        |   |       |        |

Capture of the localizer signal indicates that the aircraft is near the ground, where a high rate of descent would be inappropriate and may indicate crew error. Information requirement: caution on PFD, HUD.

2 Windshear Escape Guidance

|           |     | flight director |            |
| --------- | --- | --------------- | ---------- |
|           |     | on              | off        |
| windshear | Off |                 |            |
|           | On  |                 | FD turn on |

If windshear is encountered with the flight director off, the flight director should engage to provide escape guidance.

3 Autopilot Disengagement Warning in Unstable Configuration

|     |          | autopilot |         |
| --- | -------- | --------- | ------- |
|     |          | on        | off     |
| CG  | Stable   |           |         |
|     | Unstable |           | warning |

In some aircraft, fuel is adjusted to minimize drag during cruise. This puts the aircraft near the stability limit, and turning off the autopilot in this situation is not advised.

Information requirement: warning if the autopilot is disconnected (or disconnects on its own) when the aircraft is near instability due to CG location.

3 Gear Up for Landing

|            |              | gear    |      |        |
| ---------- | ------------ | ------- | ---- | ------ |
|            |              | up      | down | locked |
| glideslope | Captured     | warning |      |        |
|            | not captured |         |      |        |

If the glideslope has been captured and the gear are not down, the crew should be reminded to lower them. A warning is appropriate for the glideslope logic since capturing the glideslope indicates that the aircraft is close to the ground and should be ready for landing. Information requirement: warning on PFD.

3 Negative Angle of Attack Near the Ground

|                 |         | radio altitude |         |
| --------------- | ------- | -------------- | ------- |
|                 |         | very low       | low     |
| angle of attack | high + + |               |         |
|                 | level − |  caution       |         |
|                 | high −  | warning        | caution |

A negative angle of attack near the ground may indicate that the crew don't know how close they are to terrain. Information requirement: caution or warning on PFD, HUD, NAV display.

3 Angle of Attack and Unstable Configuration

|    |          | angle of attack |         |        |
|----|----------|-----------------|---------|--------|
|    |          | high +  +       | level – | high – |
| CG | Stable   |                 |         |        |
|    | unstable | caution         | warning | warning |

If the aircraft nose is pushed over with fuel transferred to minimize drag, it might be difficult to recover.

3 Localizer/Glideslope Capture Errors

|           |              | localizer |              |
|-----------|--------------|-----------|--------------|
|           |              | captured  | not captured |
| Glideslope | captured    |           | alert        |
|           | not captured | alert     |              |

When the localizer or glideslope is captured without having captured the other, the indications should clearly remind the crew that only one dimension of guidance is available so far. Should the other source never be acquired during that approach, the unusual appearance of the indications would prevent the crew from assuming complacently that both sources have been acquired. Information requirement: unique indications when only one source of guidance has been acquired.

4 Failure to Set Altimeter for the Approach

|              |            | flaps   |         |         |
|--------------|------------|---------|---------|---------|
|              |            | in      | out     | full    |
| baro altitude | very low  | caution |         |         |
|              | low        |         |         |         |
|              | transition |         | warning | warning |
|              | high       |         | warning | warning |
|              | very high  |         | warning | warning |

If the flaps are out in approach positions, the aircraft is likely setting up for the approach. If the crew have not adjusted the barometric altimeter since passing the transition altitude, the system should warn them to do so. Failure to do so may result in an approach that is several hundred feet too high or too low. If no adjustment is actually necessary because the local pressure is the same as the standard pressure, the crew should be required to positively acknowledge the correct pressure to the system. Information requirement: warning on PFD, HUD.

Also, the flaps should not be out at high altitudes. If they are extended beyond the transition altitude and above, a warning should be given to retract them. Information requirement: warning on PFD, NAV display.

4 Restricted Areas

|                  | position |
|------------------|----------|
| restricted areas | caution  |

If the planned path would take the aircraft into a restricted area, (including projected trajectories based on autopilot inputs and FMS inputs), the crew should be alerted. Information requirement: caution on NAV display.

4 Failure to Set Altimeter After Crossing Transition Altitude

|     |         | Baro altitude |     |            |      |           |
|-----|---------|---------------|-----|------------|------|-----------|
|     |         | very low      | low | transition | high | very high |
| baro | set    |               |     |            |      |           |
|     | not set |               |     | warning    | caution |        |

If the crew have not set the altimeter after crossing the transition altitude, they should be reminded to do so. If they are near the ground, this should result in a warning, as a mis-set altimeter could result in the aircraft being over a thousand feet lower than indicated. If the local pressure is actually the same as the standard pressure, the crew should be required to confirm the setting to verify that it is set as intended. In FMS equipped aircraft, this logic may be based on crossing the transition altitude itself, since the FMS knows what that altitude is.

5 Airspeed and Flap Extension

|          |           | flaps   |         |         |
|----------|-----------|---------|---------|---------|
|          |           | in      | out     | full    |
| airspeed | very low  | warning |         |         |
|          | low       |         |         |         |
|          | medium    |         | warning | warning |
|          | high      |         | warning | warning |
|          | very high |         | warning | warning |

This logic relates airspeeds to flap positions and warns the crew if the current flap selection is inappropriate for the current speed. Information requirement: warning on PFD, HUD, and NAV display.

5 Airspeed and Flap Extension

|  |  | flaps | | |
|---|---|---|---|---|
|  |  | in | out | full |
| flap speeds | 0 |  | caution | caution |
|  | Position 1 | caution |  | caution |
|  | Position 2 | caution |  | caution |
|  | Position 3 | caution |  | caution |
|  | Full | caution | caution |  |

This logic simply relates expected to actual flap positions based on airspeed. If the flap position is inappropriate for the current airspeed, a caution is given. Information requirement: caution on PFD, HUD, NAV display.

5 High Angle of Attack with Idle Throttle

|  |  | angle of attack | | | |
|---|---|---|---|---|---|
|  |  | high + | + | level − | high − |
| throttle | idle | caution |  |  |  |
|  | low |  |  |  |  |
|  | medium |  |  |  |  |
|  | high |  |  |  |  |
|  | full |  |  |  |  |

A high angle of attack at idle throttle may set the aircraft up for a stall. Information requirement: caution on PFD, HUD.

6 Thrust and Terrain Clearance

|  |  | weather | terrain | restricted areas | fuel range | flight plan trajectory | programmed trajectory |
|---|---|---|---|---|---|---|---|
| Throttle | idle |  | check |  |  |  |  |
|  | low |  | check |  |  |  |  |
|  | medium |  |  |  |  |  |  |
|  | high |  |  |  |  |  |  |
|  | full |  |  |  |  |  |  |

The system should check the current throttle command for terrain clearance. If inadequate clearance is discovered, the system should maintain enough thrust to provide clearance until the crew confirm the command or override the inhibit. Information requirement: caution, warning on PFD, HUD, NAV display.

CONCLUSION

A system and method compares combinations of vehicle state variable values against known combinations of potentially dangerous vehicle states. Alarms and error messages are selectively generated based on such comparisons. Aircraft embodiments have been described, although the method may be applied to other vehicles. One methodology of initially determining potentially unsafe combinations has been described using a matrix to aid in exhaustively considering all potential pairs of state values. The database of unsafe combinations can be generated in many other different manners, from review of empirical evidence, to brainstorming about potential undesired combinations. The method and system for performing comparisons with actual states of the vehicle are not restricted to the manner in which the database is generated.

Some embodiments of the present invention provide a high level synthesis of pre-defined fault conditions with failure formatting and alerting messages to crews. It provides a comprehensive real-time comparison of state variables. Recognition of nonsensical anomalies is provided as opposed to low value "invalid data" indications. Context based indicator formatting is provided in some embodiments.

The invention claimed is:

1. A method of determining unsafe conditions for a vehicle, the method comprising:
   monitoring values of states of the vehicle;
   comparing combinations of such values of states to known unsafe combinations; and
   identifying combinations of values of states of the vehicle that correspond to the unsafe combinations.

2. The method of claim 1 and further comprising notifying operators of the vehicle of such identified unsafe combinations.

3. The method of claim 1 and further comprising obtaining the values of states from sensors.

4. The method of claim 1 wherein the vehicle comprises an aircraft.

5. The method of claim 1 wherein one state comprises a command.

6. The method of claim 1 wherein the combinations comprise speedbrake state variables and state variables selected from the group consisting of flaps, gear, glideslope, flap speeds, radio altitude, pitch, throttle, thrust, GPWS, windshear, and vertical speed.

7. The method of claim 1 wherein the values are quantized.

8. The method of claim 1 periodically repeated in correspondence with a fixed wait time.

9. A method of determining unsafe conditions for an aircraft for operators of the aircraft, the method comprising:
   monitoring values of states of the vehicle wherein such values comprise sensed values and operator commands;
   comparing combinations of such values of states to known unsafe combinations;
   identifying combinations of values of states of the vehicle that correspond to the unsafe combinations; and
   alerting operators of the aircraft to identified unsafe combinations.

10. The method of claim 9 wherein alerting operators comprises a warning.

11. The method of claim 9 wherein alerting operators comprises providing an error message representative of the combination.

12. The method of claim 11 wherein the error message identifies a solution to the unsafe condition.

13. The method of claim 9 and further comprising obtaining the values of states from sensors and commands.

14. The method of claim 9 wherein the combinations comprise speedbrake state variables and state variables selected from the group consisting of flaps, gear, glideslope, flap speeds, radio altitude, pitch, throttle, thrust, GPWS, windshear, and vertical speed.

15. The method of claim 9 wherein the values are quantized.

16. A system that identifies unsafe conditions of an aircraft, the system comprising:
   a module that identifies values of states of the aircraft;
   a database of known unsafe combinations of values of states that compares the identified values of states with the known unsafe combinations; and
   a mechanism that notifies an operator of the aircraft of unsafe combinations of values of states.

17. The system of claim 16 wherein the notification mechanism comprises a display that displays warning messages representative of the unsafe combinations.

18. The system of claim 16 and further comprising a plurality of sensors distributed about the aircraft.

19. The system of claim 16 and further comprising an input device for accepting operator commands.

20. The system of claim 16 wherein the states comprise commands and sensor values.

21. The system of claim 16 wherein the database further comprises messages associated with unsafe combinations.

22. A method of determining combinations of unsafe values of combinations of states of an aircraft, the method comprising:
   forming a matrix of states and values of such states;
   analyzing combinations of such values for different states;
   determining potential unsafe combinations; and
   generating a database of such unsafe combinations.

23. A method of determining unsafe combinations of values of states of an aircraft, the method comprising:
   receiving values of states of the aircraft;
   generating combinations of such values for the different states; and
   comparing such combinations with known combinations to determine unsafe states of the aircraft.

24. A computer readable medium having instructions for causing a computer to implement a method of determining unsafe conditions for a vehicle, the method comprising:
   monitoring values of states of the vehicle;
   comparing combinations of such values of states to known unsafe combinations; and
   identifying combinations of values of states of the vehicle that correspond to the unsafe combinations.

25. The computer readable medium of method of claim 24 wherein the method further comprises obtaining the values of states from sensors and commands.

26. The method of claim 24 wherein the combinations comprise speedbrake state variables and state variables selected from the group consisting of flaps, gear, glideslope, flap speeds, radio altitude, pitch, throttle, thrust, GPWS, windshear, and vertical speed.

27. The method of claim 24 wherein the values are quantized.

28. A computer readable medium having instructions for causing a computer to implement a method of determining unsafe conditions for an aircraft for operators of the aircraft, the method comprising:
   monitoring values of states of the vehicle wherein such values comprise sensed values and operator commands;
   comparing combinations of such values of states to known unsafe combinations;
   identifying combinations of values of states of the vehicle that correspond to the unsafe combinations; and
   alerting operators of the aircraft to identified unsafe combinations.

29. The computer readable medium of claim 28 wherein the values are quantized.

30. A system that identifies unsafe conditions of an aircraft, the system comprising:
   a module that identifies values of states of the aircraft;
   means for comparing combinations of such values of states to known unsafe combinations;
   means for identifying combinations of values of states of the vehicle that correspond to the unsafe combinations; and
   means for alerting operators of the aircraft to identified unsafe combinations, a database of known unsafe combinations of values of states that compares the identified values of states with the known unsafe combinations.

* * * * *